(12) United States Patent
Wengerd et al.

(10) Patent No.: US 6,450,466 B1
(45) Date of Patent: Sep. 17, 2002

(54) SUSPENSION BRACKET FOR FIREPLACE MANTEL

(75) Inventors: Dean Wengerd, Wilmot, OH (US); Candace Anderson, Petersham, MA (US)

(73) Assignee: Wooster Toy Kraft LLC, Wooster, OH (US)

( * ) Notice: Subject to any disclaimer, the term of this patent is extended or adjusted under 35 U.S.C. 154(b) by 0 days.

(21) Appl. No.: 09/630,220

(22) Filed: Aug. 2, 2000

(51) Int. Cl.[7] ............................................. A47B 96/06
(52) U.S. Cl. ..................... 248/231.71; 248/228.6; 248/316.2; 248/229.15
(58) Field of Search ................ 248/231.71, 231.31, 248/228.2, 228.6, 316.2, 229.15, 229.11; 211/86.01, 86, 105.1, 162

(56) References Cited

U.S. PATENT DOCUMENTS

| | | | | |
|---|---|---|---|---|
| 3,568,970 A | * | 3/1971 | Mallett | 248/311 |
| 3,991,961 A | * | 11/1976 | Platzer, Jr. | 248/99 |
| 4,767,131 A | * | 8/1988 | Springer et al. | 280/289 |
| 5,277,392 A | * | 1/1994 | Rossman et al. | 248/231.7 |
| 5,288,042 A | * | 2/1994 | Grimm | 248/118 |
| 5,590,607 A | * | 1/1997 | Howard | 108/98 |
| 5,642,819 A | | 7/1997 | Ronia | |

* cited by examiner

Primary Examiner—Leslie A. Braun
Assistant Examiner—A. Joseph Wujciak, III
(74) Attorney, Agent, or Firm—Richard B. O'Planick

(57) ABSTRACT

A clamping bracket is disclosed for use in suspending an article, such as a Christmas stocking, from a fireplace mantel beam. The bracket comprises a top arm member and a vertical arm member intersecting to form an L-shaped body. A clamping mechanism rotatably attaches into an alternative one of a plurality of sockets within the vertical arm member to adjust the spacing between the clamping mechanism and the top arm member. The clamping mechanism comprises a rotatable pin and a cam member affixed to a remote end of the pin which rotates with the pin member into a clamping engagement with the underside of a fireplace mantel beam. An accessory attachment device is further disclosed removeably attached to an upper surface of the top arm member as a decorative option.

22 Claims, 4 Drawing Sheets

SUSPENSION BRACKET FOR FIREPLACE MANTEL

TECHNICAL FIELD

The present invention relates generally to a suspension bracket for facilitating the suspension of an article from a horizontal beam. More particularly, the present invention relates to a fireplace mantel suspension bracket from which an item such as a stocking may be suspended.

BACKGROUND OF THE INVENTION

The Prior Art

It is a Christmas holiday tradition to suspend stockings from the mantel of a fireplace. Various methods and mechanisms for attaching a stocking to a horizontal mantel beam have been tried and found wanting for different reasons. One simple approach has been to drive a nail into the wooden mantel and suspend the stocking therefrom. However, for aesthetic and safety reasons, a protruding nail from the mantel of a fireplace constitutes a less than satisfactory means for suspending a stocking. A nail is not only aesthetically undesirable when protruding from a fireplace but, once removed, leaves the mantel with an unsightly perforation.

A second approach has been to wedge a peg or nail between the mantel and the brick or masonry fireplace construct therebelow. Such an approach, however, does not eliminate the safety concern resulting from a nail protruding from the fireplace or the aesthetic desire of the homeowner for an attractive hanging mechanism. Moreover, such an attachment is often insecure and can become disattached while supporting a heavily filled stocking.

In response to the limitations discussed above in suspending a stocking from a protruding nail or hook, clamping devices have been suggested for attachment to the mantel of a fireplace. U.S. Pat. No. 5,642,819, entitled "Christmas Stocking Holder" teaches one such clamping device. The clamping device comprises a C-shaped bracket having a top arm extendable over the top of a mantel and a bottom arm underlying a lower surface of the mantel. A tightening screw extends through the lower arm and presses against the underside of the mantel to secure the bracket to the mantel. A peg is provided extending forwardly from the bracket from which a stocking may be suspended.

While the device taught in U.S. Pat. No. 5,642,819 represents an improvement over the simplistic use of a protruding nail, certain shortcomings in the device prevent it from representing an entirely satisfactory solution. First, the clamping screw contacts the underside of the mantel in a pointed fashion, which can cause an undesirable defacement visible upon its removal. Secondly, the clamping screw is clearly visible when in use, depending from the bottom arm of the bracket. As such, the clamping mechanism presents a utilitarian impression, which is aesthetically unattractive.

SUMMARY OF THE INVENTION

The present invention overcomes the deficiencies in existing mechanisms utilized in the suspension of articles from a fireplace mantel. The invention comprises an L-shaped bracket having a top horizontal arm member and a vertical arm member joined to a forward end of the top arm member at a right angle. The top arm member is positioned over the top surface of a fireplace mantel and the vertical arm member depends from the top arm member across the forward face of the mantel beam. A series of vertically spaced apart sockets are formed within an inward side of the vertical arm member from proximate a lower end of the arm member to a top end. A clamping device is provided comprising a cam clamp member affixed to a remote end of a pin member. The user selects a socket most proximate to an underside of the mantel beam and inserts the opposite end of the pin member therein such that the cam clamp member is positioned beneath the lower surface of the mantel beam. The pin is diametrically dimensioned for close receipt within an alternative one of the sockets and is free to rotate whereby causing the cam clamp member at its inward end to rotate into a clamping engagement with the underside of the mantel beam. The bracket is thereby affixed securely to the mantel beam and a stocking or other object may be suspended from a suspension peg extending forwardly from the vertical arm member.

The clamping device can be inserted into alternative sockets to adapt to fireplace mantel beams of varying thickness. Moreover, the cam clamp member and the pin member to which it attaches are hidden behind the vertical arm member when in use, providing the suspension bracket with an aesthetically pleasing appearance from the visible front perspective. In addition, the cam clamp member engages the lower surface of the mantel beam across a relatively broad surface area and, accordingly, does not leave an aesthetically unattractive mark on the beam when removed.

According to a preferred embodiment of the invention, a slot is formed within the top surface of the horizontal arm member of the bracket and slideably receives an upstanding decorative accessory attachment therein. The accessory attachment can take the form of a decorative figure or scene or the form of a name placard by which the owner of the stocking can be identified.

It is, accordingly, an object of the invention to provide a fireplace mantel suspension bracket, which is adjustable to accommodate attachment to a mantel beam of varying thickness.

A further object of the invention is to provide a suspension bracket, which can be positively and reliably secured to a mantel beam.

Yet a further object of the invention is to provide a suspension bracket, which leaves no visible mark on the mantel beam once removed.

Another object of the invention is to provide a suspension bracket in which the clamping mechanism is not visible when in use.

A further object of the invention is to provide a suspension bracket to which a decorative attachment accessory may be readily attached.

Yet another object of the invention is to provide a suspension bracket for a fireplace mantel beam, which is economically and readily manufactured and convenient to assemble.

These and other objects, which will be apparent to those skilled in the art, are achieved by a preferred embodiment which is described in detail below and which is illustrated in the accompanying drawings.

BRIEF DESCRIPTION OF THE ACCOMPANYING DRAWINGS

FIG. 3 is a top plan view of the cam member and in clamping mechanism

DESCRIPTION OF THE PREFERRED EMBODIMENT

Figure 1:
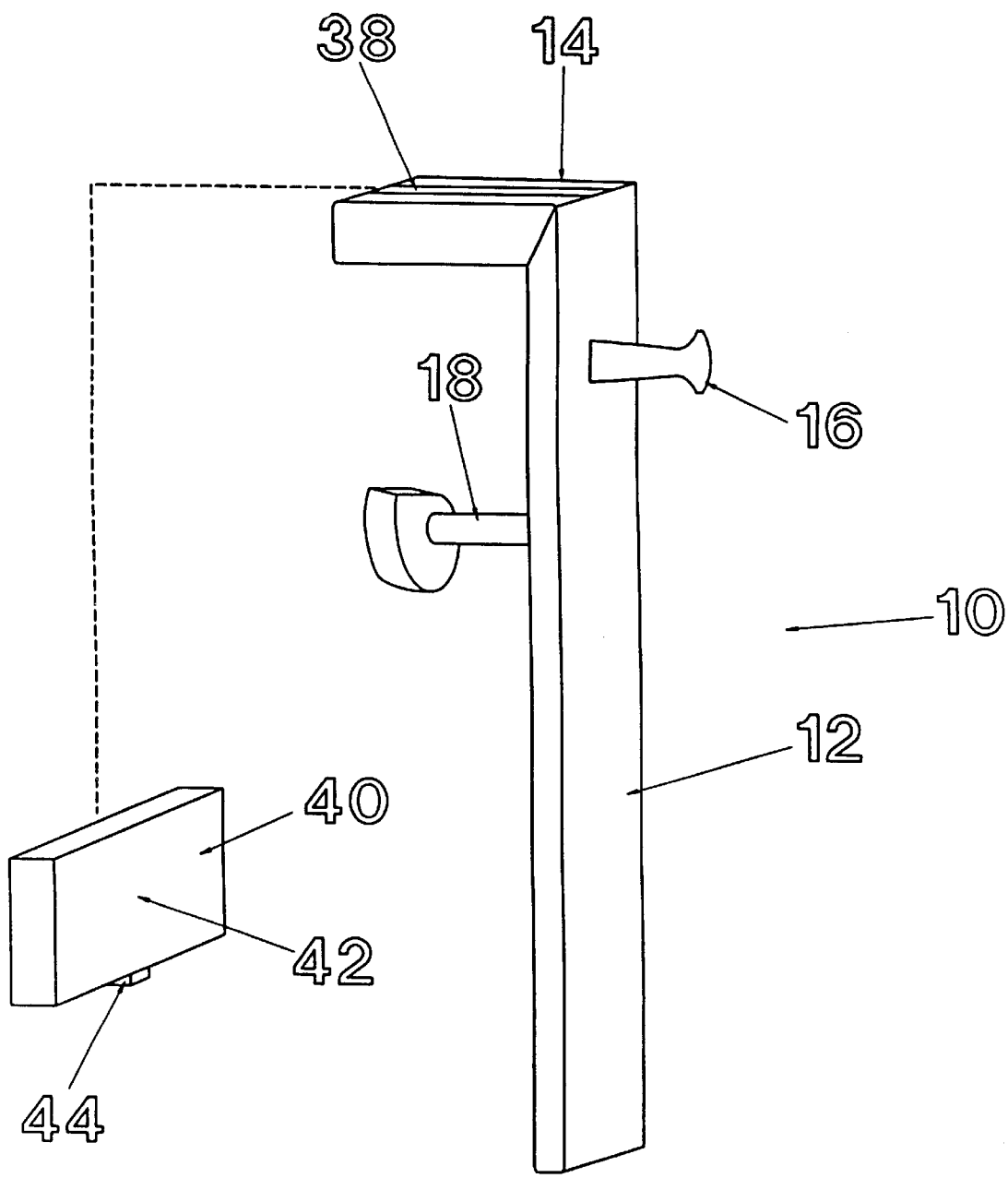
FIG. 1 is an exploded front perspective view of the subject suspension bracket and accessory.

Referring initially to FIG. 1, the subject mantel suspension bracket 10 is shown as substantially L-shaped, comprising a vertical forward facing arm member 12; a rearwardly extending horizontal arm member 13; a suspension peg 16; and a clamping mechanism 18. Each of the components 12, 14, 16, and 18 are preferably formed of wood for aesthetic reasons; however, such components may be made of conventional plastic or other suitable material by conventional manufacturing means such as injection molding if so desired.

The suspension peg 16 is formed integrally with the vertical arm member 12, positioned as shown proximate a lower end. Alternatively, the peg 16 may be positioned at any location along the arm member 12. The peg 16 projects forwardly and represents the protrusion from which a stocking (not shown) may be suspended from the bracket.

Figure 2:
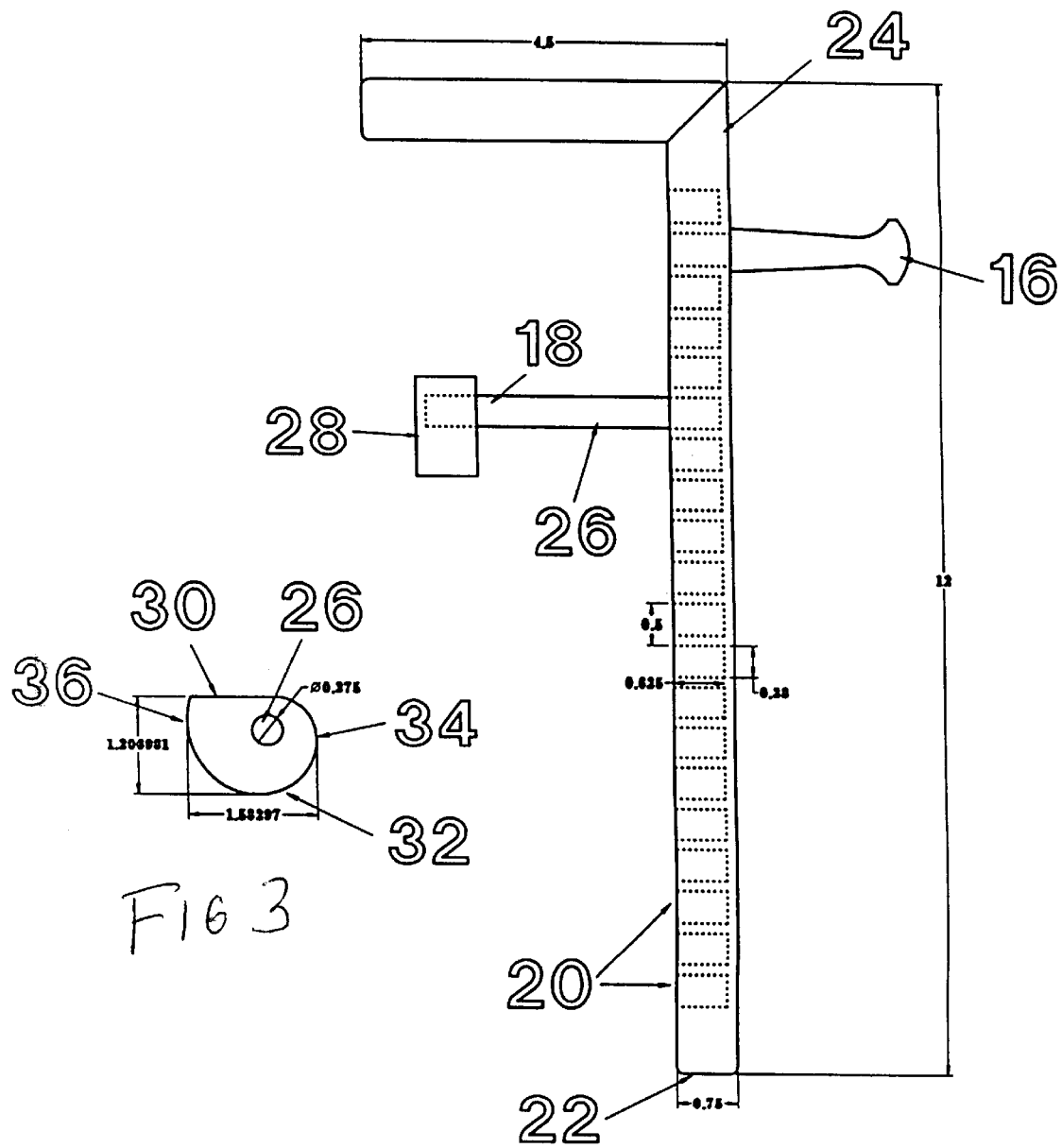
FIG. 2 is a side elevation view shown partially in phantom of the suspension bracket.
Figure 4:
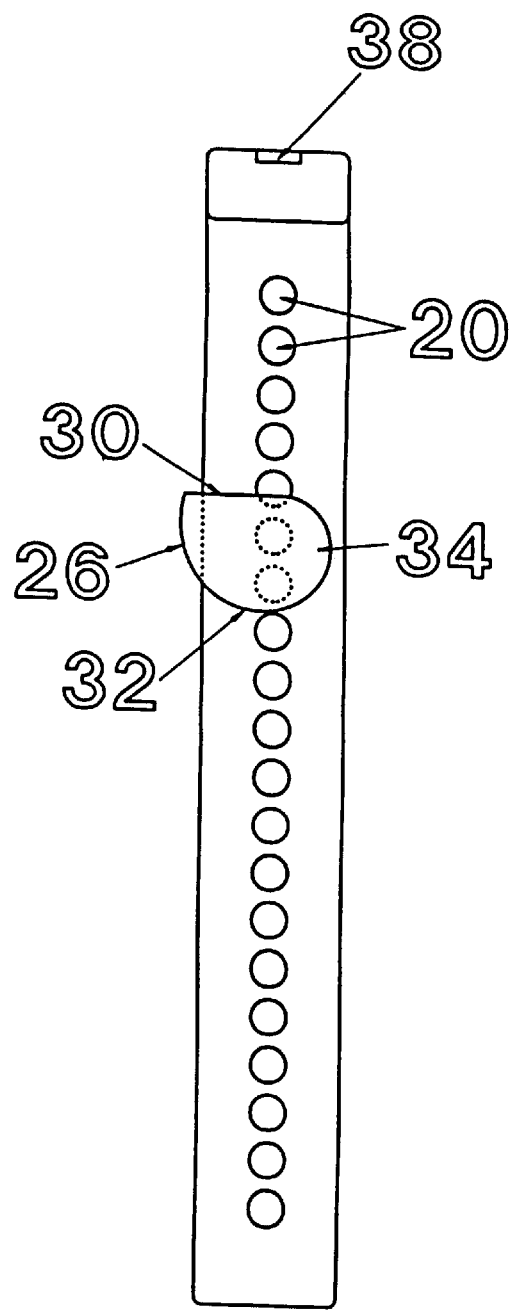
FIG. 4 is a front elevational view of the suspension bracket.

As shown in FIGS. 2 and 4, the vertical arm member 12 is provided with a series of integrally formed circular sockets 20 extending into a rearward side. The vertical arm 12 in the shown preferred embodiment has a width dimension of 0.624 inches and each socket 20 extends into the arm 12 approximately 0.625 inches and has a diameter of 0.38 inches. The series of sockets 20 extend substantially from a lower end 22 of arm 12 to an upper end 24. Centerline to centerline, the sockets 20 are separated by a distance of 0.5 inches.

The clamping mechanism 18 comprises a cylindrical pin member 26 and a cam lobe shaped cam member 28 rigidly connected to a remote inward end of the pin member 26. The cam member 28, as best seen from FIG. 3, is provided with a circular through bore having a diameter nominally smaller than the diameter of pin member 26. Pin member 26 is inserted into the cam member bore in press fit manner and, so seated, is rigidly connect to the cam member at an inward end. The pin member 26 has a diameter of 0.375 inches which, being nominally larger smaller than the 0.38 inch diameter of each socket 20, allows insertion of the pin member into an alternative one of sockets 20 with clearance. So positioned, the pin member 26 is free to rotate and the cam member 28 rotates unitarily therewith.

The shape of the cam member 28 will be apparent from FIGS. 3 and 4. The cam member 28 has a flat upper surface 30 spaced from a radius lower surface 32 by 1.20 inches. The cam member 28 has a width dimension of 150 inches measured from one side 34 to an opposite side 36. The pin member 26 is inserted into one of the sockets 20 in such a manner so as to orient surface 30 of the cam member 28 to the top. Selection of one of the sockets 20 is dictated by the width of the mantel beam to which the bracket 10 is to be attached.

In use, the clamping mechanism 18 is initially withdrawn from the vertical arm member 12. The horizontal arm member 14 is located upon the top of a mantel horizontal beam and the vertical arm member 12 extends downwardly across the front face of the beam (not shown). The clamping mechanism pin member 26 is then inserted into the one socket 20 closest to a bottom surface of the mantel beam with the flat surface 30 of the cam member 28 disposed in close proximity below the beam. Thereafter, the cam member 28 is rotated in a counter-clockwise direction to initiate a clamping frictional engagement between the radius surface 32 of the cam member 28 and the beam underside. The clamping bracket 10 is thus securely affixed to the mantel beam and an article, such as a stocking, can be suspended from peg 16.

It will be appreciated that the clamping mechanism 18 adjusts vertically and can insert into any one of the sockets along the vertical arm member 12. Accordingly, the clamping mechanism 18 can accommodate mantel beams of varying thickness. Moreover, a downwardly loading of peg 16 from a heavily laden stocking will serve to increase the pressure of the cam member 28 against the underside of a mantel beam, making the attachment of the bracket even more secure.

Referring to FIG. 1, an accessory mounting slot 38 is shown within the upper horizontal arm 14, extending from a rearward end toward a forward end. Such a slot may be of dovetail configuration in cross section if so desired. The slot 38 is intended to provide means for mounting an optional accessory device to the top of the bracket 10. Representing one embodiment of such an optional device is attachment panel 40 shown in FIG. 1. Panel 40 is generally rectangular in configuration and provides a flat forward facing panel surface 42. Extending transversely across a bottom of the panel 40 is a guide flange 44.

Attachment of the panel 40 to the top of the bracket 10 is accomplished by aligning the flange 44 to enter into the rearward open end of slot 38, and thereafter sliding the panel flange 44 forward. The orientation of the flange 44 is normal to the longitudinal face of surface 42. Accordingly, panel surface 42 in the attached position faces forwardly and provides a surface upon which a decorative design may be placed. Alternatively, if so desired, the surface 42 may provide a nameplate for identifying the individual corresponding to the particular stocking hanging from the bracket 10. A further alternative embodiment is to shape the attachment 40 in the form of a figure which would, upon attachment to the slot 38, would project upward fro the upper arm member 14. Further alternative attachments, apparent to those skilled in the art, can be substituted and assembled to the top of the upper arm member 14 if so desired.

The shape of flange 44 may be of a complementary dovetailing cross section to the slot 38 transverse section, making the attachment of panel 40 to the arm member 14 secure. It will further be appreciated from FIG. 1 that the suspension peg 16 may be located at any position along the vertical arm member 12. The forward facing surface of arm member 12 further can provide a flat surface upon which decorative elements may be added, whereby further enhancing the aesthetic appeal of the bracket 10.

Figure 5:
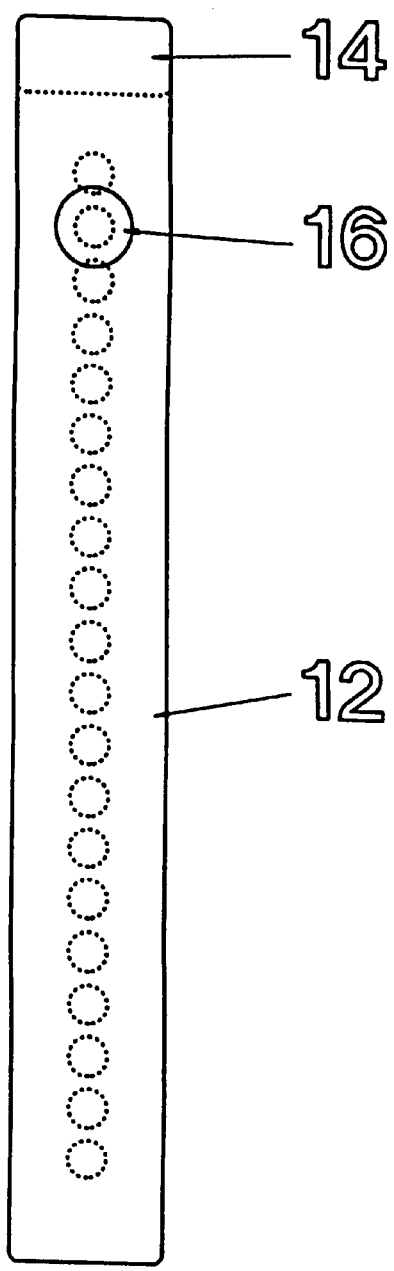
FIG. 5 is a rear elevational view thereof.

From FIGS. 4 and 5 it will be readily appreciated that the clamping mechanism 18 is hidden in use behind the vertical arm member 12. As such, the mechanism 18 does not detract from the aesthetic appearance of the bracket 10. Moreover, adjustability of the bracket clamping mechanism upward or downward along the arm member 12 allows the bracket 10 to conform to mantel beams of varying thickness and configuration. The clamping mechanism 18 engages the underside of the mantel beam in a surface to surface manner and does not leave an unattractive mark on the mantel beam once removed.

While the above describes a preferred embodiment of the subject invention, the invention is not intended to be so limited. Other embodiments, which will be apparent to those skilled in the art, and which utilize the teachings herein set forth, are intended to be within the scope and spirit of the invention. By way of example, without any intent to limit the scope of alternative embodiments in which the invention is embodied, the arms 12, 14 can be configured in various shapes and decorated so as to complement one another. In addition, materials used in the manufacture of the arm members 12, 14, and attachment 30 may be varied for aesthetic considerations.

What is claimed is:

1. A bracket for suspending an article from a beam member, comprising:

a top arm member;

a forward arm member depending from a forward portion of the top arm member, the forward arm member having a forward facing surface and a rearward facing surface;

a protrusion extending forwardly from the forward facing surface of the forward arm member for suspending an article therefrom;

the forward arm member includes a plurality of sockets extending into the rearward facing surface at respective spacings from the top arm member;

a clamping mechanism positioned on a side of the forward arm member opposite the protrusion, the clamping mechanism rotatably residing within and extending rearwardly, the clamping mechanism including a rearward clamping protrusion which rotates between an unclamped first position and a clamping second position; and the clamping mechanism is moveable between and rotatably resides within an alternative one of the plurality of sockets.

2. A bracket according to claim 1, wherein the plurality of sockets are located at varying distances from the top arm member.

3. A bracket according to claim 2, wherein the clamping mechanism rearward clamping protrusion comprises at least one cam surface.

4. A bracket according to claim 1, wherein the clamping mechanism rearward clamping protrusion comprises at least one cam surface.

5. A bracket according to claim 1, wherein further comprising a detachable attachment device affixed to an upper surface of the top arm member.

6. A bracket according to claim 5, wherein the upper surface of the top arm attachment device includes a dependent flange protrusion moveable into and out of the top arm member slot.

7. A bracket according to claim 1, wherein the clamping protrusion is obscured behind the forward arm member in the second clamped position.

8. A bracket for suspending an article from a beam member, comprising;

a top arm member;

a forward arm member depending from a forward portion of the top arm member, the forward arm member having a forward facing side and a rearward facing side;

a clamping mechanism attachable to the forward arm member rearward facing side at a plurality of alternative locations, and the clamping mechanism is relocatable vertically along the forward arm member to alter the spacing between the clamping mechanism and the top arm member.

9. A bracket according to claim 8, wherein the clamping mechanism comprises a clamping surface at a rearward end.

10. A bracket according to claim 9, wherein the clamping mechanism rotatably attaches to the forward arm member and the clamping surface rotates between an unclamped first position and a clamping second position.

11. A bracket according to claim 10, wherein the clamping surface comprises at least one cam surface.

12. A bracket according to claim 8, wherein the forward arm members comprises a plurality of sockets extending therein and located at varying distances from the top arm member.

13. A bracket according to claim 12, wherein the clamping mechanism comprises a pin rotatably seated within an alternative one of the sockets and a clamping protrusion disposed at a rearward end of the pin and rotating therewith between an unclamped first position and a clamping second position.

14. A bracket according to claim 13, wherein the clamping protrusion comprises at least one cam surface.

15. A bracket according to claim 8, wherein the clamping mechanism moves between an unclamped first position and a clamping second position in which the clamping mechanism is obscured from view behind the forward arm member.

16. A bracket according to claim 8, wherein further comprising a detachable attachment device affixed to an upper surface of the top arm member.

17. A bracket according to claim 16, wherein the upper surface of the top arm member includes a slot extending downwardly therein and the detachable attachment device includes a dependent flange protrusion moveable into and out of the top arm member slot.

18. A bracket for suspending an article from a beam member, comprising;

a top arm member;

a forward arm member depending from a forward portion of the top arm member, the forward arm member having a forward facing side and a rearward facing side;

a clamping mechanism attachable to the forward arm member rearward facing side and moveable between an unclamped first position and a clamping second position;

a detachable attachment device affixable to an upper surface of the top arm member.

19. A bracket according to claim 18, wherein the clamping mechanism adjusts vertically along the forward arm member to alter the spacing between the clamping mechanism and the top arm member.

20. A bracket according to claim 18, wherein the clamping mechanism is obscured from view behind the forward arm member while in the clamping second position.

21. A bracket according to claim 18, wherein the attachment device comprises a forward facing panel surface.

22. A bracket according to claim 18, wherein the upper surface of the top arm member includes a slot extending downwardly therein and the detachable attachment device includes a dependent flange protrusion moveable into and out of the top arm member slot.

* * * * *